(12) United States Patent
Patel et al.

(10) Patent No.: US 8,197,288 B1
(45) Date of Patent: Jun. 12, 2012

(54) TERMINAL BLOCK HAVING ADJOINING TRANSVERSE SURFACES WITH PROTRUSIONS

(75) Inventors: Dhaval Patel, Loves Park, IL (US); Laurence D. Vanek, Janesville, WI (US); Luke Wagner, Rockford, IL (US); Edward C. Allen, Davis, IL (US); Alan D. Hanson, Winnebago, IL (US); Gordon W. Friske, Rockford, IL (US); Glenn C. Lemmers, Jr., Loves Park, IL (US); Nathan A. Berry, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/085,764

(22) Filed: Apr. 13, 2011

(51) Int. Cl.
*H01R 9/22* (2006.01)
(52) U.S. Cl. .......................................................... 439/709
(58) Field of Classification Search .................. 439/709, 439/721
See application file for complete search history.

(56) References Cited

U.S. PATENT DOCUMENTS

| | | | |
|---|---|---|---|
| 4,174,147 A * | 11/1979 | Waddington et al. ......... | 439/636 |
| 4,835,650 A | 5/1989 | Epstein | |
| 5,169,338 A | 12/1992 | Dewar et al. | |
| 5,326,285 A * | 7/1994 | Maros ............................ | 439/717 |
| 5,413,500 A | 5/1995 | Tanaka | |
| 5,791,936 A | 8/1998 | Nicholson | |
| 5,800,219 A | 9/1998 | Siedlik et al. | |
| 5,993,267 A * | 11/1999 | Lin ................................ | 439/709 |
| 6,176,747 B1 * | 1/2001 | Rowe et al. .................... | 439/721 |
| 6,291,878 B1 | 9/2001 | Anderson et al. | |
| 6,576,838 B2 | 6/2003 | Matsumura | |
| 7,097,502 B2 * | 8/2006 | Landis et al. ................. | 439/595 |
| 7,285,019 B2 * | 10/2007 | Sakai et al. .............. | 439/620.09 |
| 7,310,573 B2 | 12/2007 | Stickling | |
| 7,472,547 B2 | 1/2009 | Grosskopf et al. | |
| 7,559,810 B1 * | 7/2009 | Wu ................................ | 439/801 |
| 7,601,037 B2 | 10/2009 | Telakowski et al. | |
| 7,857,669 B1 | 12/2010 | Wavering | |
| 2004/0229518 A1 * | 11/2004 | Landis et al. ................. | 439/709 |
| 2008/0197726 A1 | 8/2008 | Dubuc et al. | |
| 2008/0311763 A1 | 12/2008 | Dubuc et al. | |
| 2010/0054005 A1 | 3/2010 | Grosskopf et al. | |

OTHER PUBLICATIONS

U.S. Appl. No. 12/872,072, filed Aug. 31, 2010, "Terminal Block Cover With Nut Retention Feature".

* cited by examiner

*Primary Examiner* — Chandrika Prasad
(74) *Attorney, Agent, or Firm* — Carlson, Gaskey & Olds, P.C.

(57) ABSTRACT

A terminal block assembly for a generator includes a terminal block having a base with a first and second transverse surfaces adjoining one another. Spaced apart protrusions extend from the first and second surfaces to provide spaced apart terminal areas overlapping the first and second surface. The terminal areas are configured to receive a cable lug. A terminal stud is provided in each terminal area and extends from the second surface. The first surface is without terminal studs. A cable lug secured to the terminal stud is arranged in the terminal area.

13 Claims, 5 Drawing Sheets

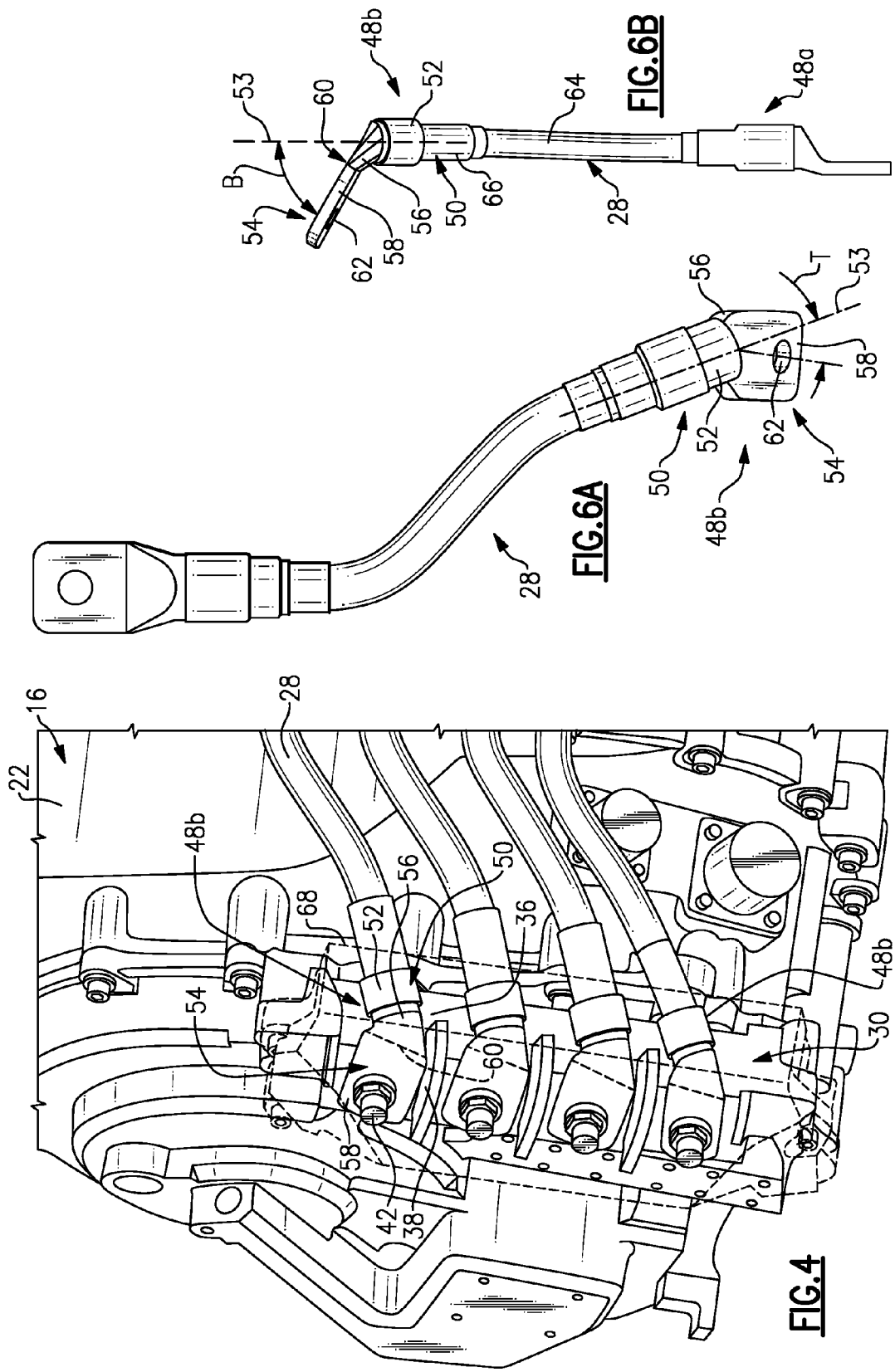

US 8,197,288 B1

TERMINAL BLOCK HAVING ADJOINING TRANSVERSE SURFACES WITH PROTRUSIONS

BACKGROUND

This disclosure relates to a terminal block assembly, and more particularly, to a rear terminal block assembly for use on a gas turbine engine generator.

In gas turbine engine generator applications, a terminal block assembly provides a connection between the phase leads and the generator stator. The terminal block assembly is used to protect the phase terminals from arcing from the terminal leads and adjacent conducting surfaces. The terminal block assembly is also used to protect the phase terminals from foreign object debris that could cause electrical shorting. In some applications, a rear terminal block assembly is also used to provide a more accessible location to make electrical connections than the terminal block assembly connected to the stator.

Additionally, the terminal block assemblies must maintain operating electrical integrity during lightning strikes, which may occur at high operational altitude. Thus, the terminal block assemblies must withstand significant voltages at high altitude conditions.

SUMMARY

A terminal block assembly for a generator includes a terminal block having a base with a first and second transverse surfaces adjoining one another. Spaced apart protrusions extend from the first and second surfaces to provide spaced apart terminal areas overlapping the first and second surface. The terminal areas are configured to receive a cable lug. A terminal stud is provided in each terminal area and extends from the second surface. The first surface is without terminal studs.

An electrical cable includes a jacketed wire having first and second opposing ends respectively including first and second lugs. The second lug has a barrel providing a barrel axis and receives the jacketed wire. A second lug includes a flange having first and second portions. The first portion interconnects the barrel and the second portion. The first and second portions adjoin one another at a bend providing twist and bend angles between the first and second bend portions of respectively approximately 27 degrees and 57 degrees, for example. The flange is positioned in the terminal area with the second portion secured to the terminal stud.

A method of assembling a generator supply includes providing first and second terminal block assemblies on a generator housing. A cable is provided having first and second ends. The first end is secured to the first terminal block assembly. A first lug on the second end is arranged onto a terminal stud of the second terminal block assembly. A second lug of a second cable is arranged onto the terminal stud. The first and second lugs are clamped to the terminal stud.

BRIEF DESCRIPTION OF THE DRAWINGS

The disclosure can be further understood by reference to the following detailed description when considered in connection with the accompanying drawings wherein:

FIG. 4 is a partial perspective view of the generator with the cables secured to the terminal block and the cover illustrated in phantom.

FIG. 6A is a first elevational view of an example cable.

FIG. 6B is a second elevational view of the cable illustrated in FIG. 6A.

DETAILED DESCRIPTION

Figure 1:
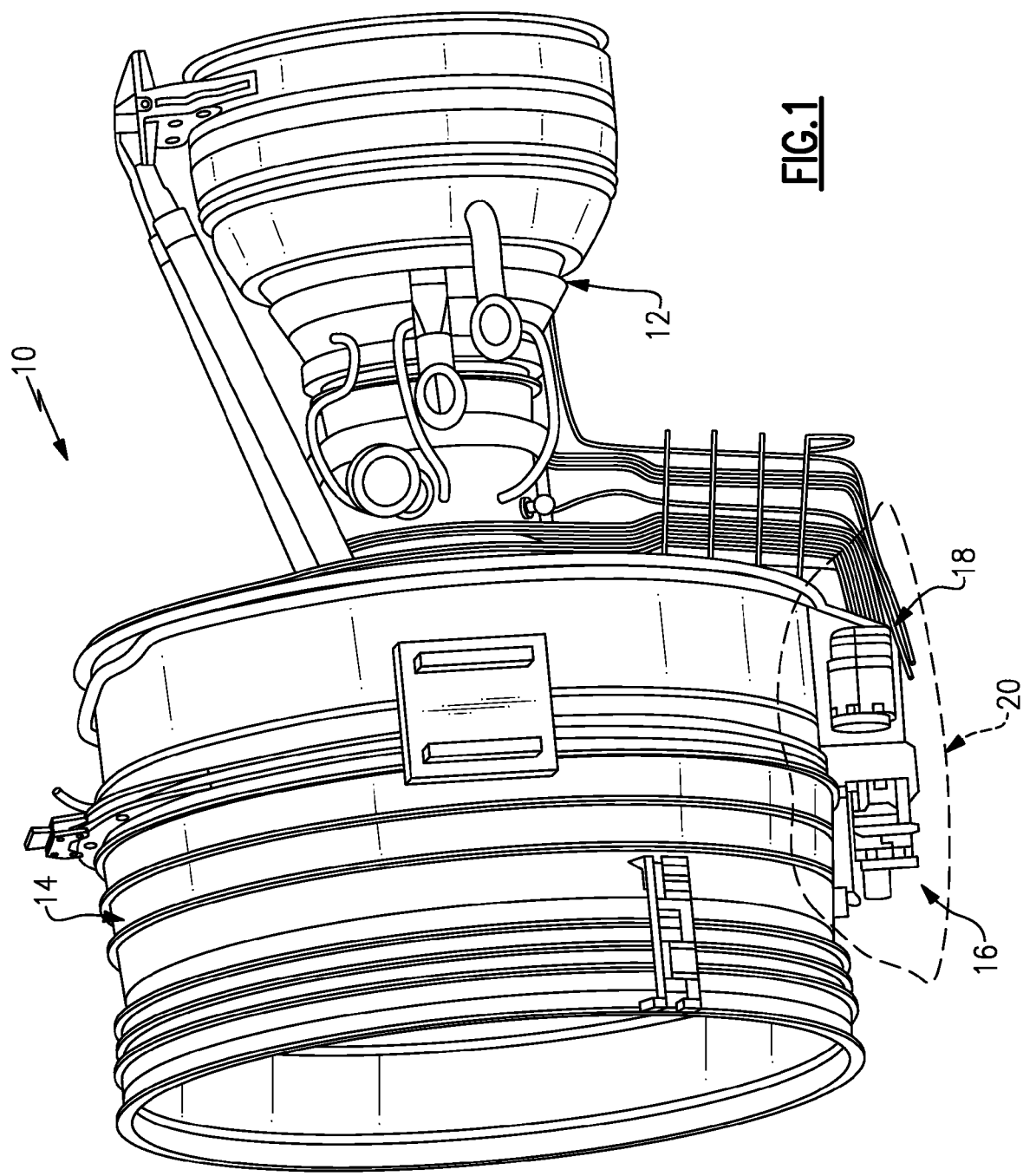
FIG. 1 is a perspective view of an example gas turbine engine.

An example gas turbine engine 10 is illustrated in FIG. 1. The gas turbine engine 10 includes a core 12 supported relative to a fan case 14 in a high bypass configuration. One or more generators 16, 18 are supported on the engine 10. The fan case 14 and generators 16, 18 are covered by a fan nacelle 20. The fan nacelle 20 can obstruct maintenance workers from access to the generators 16, 18. In such instances, it may be desirable to configure the interface where the aircraft power feeders connect to the generator terminal block for improved access.

Figure 2:
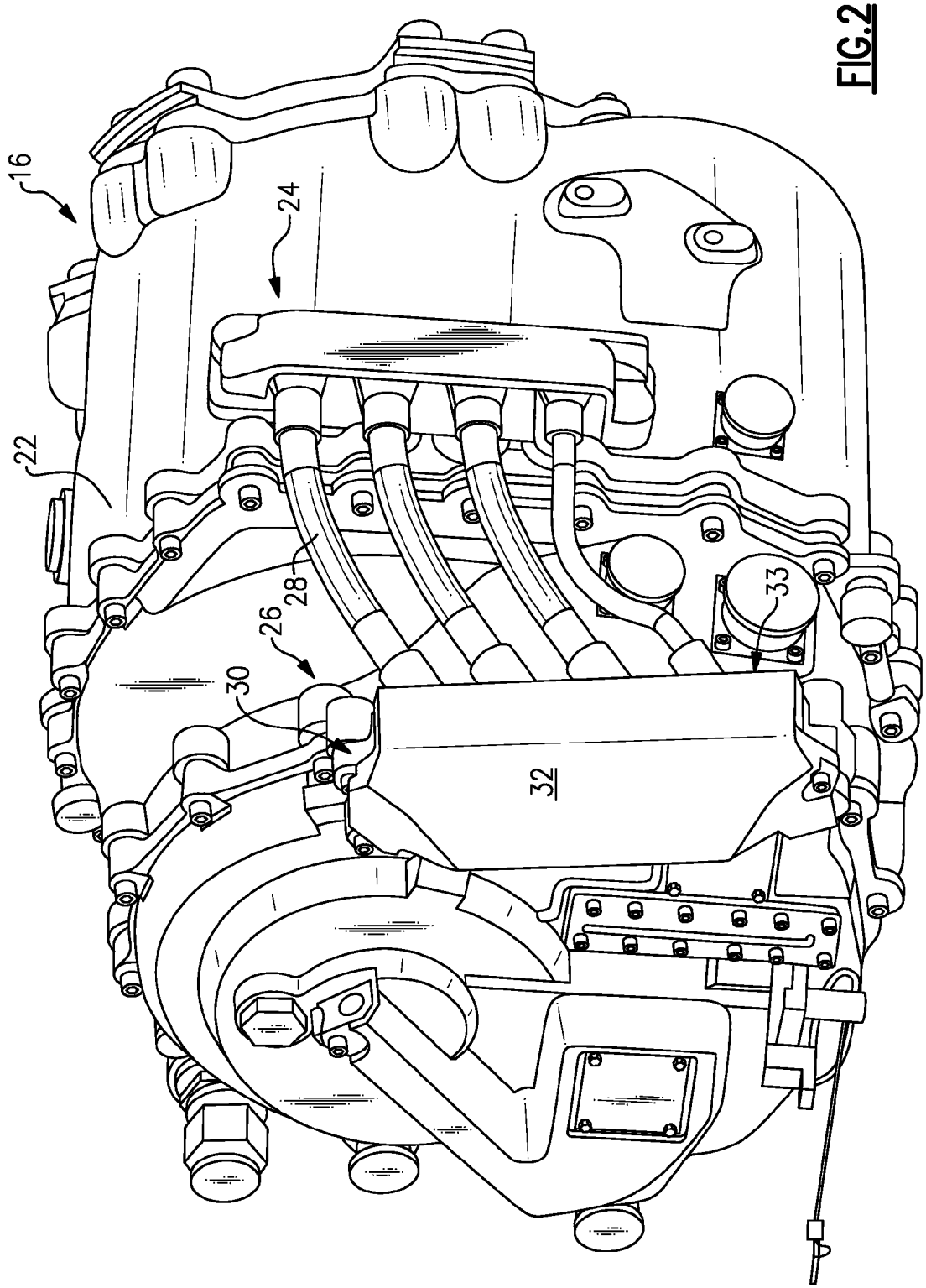
FIG. 2 is a side perspective view of an example generator having a first and second terminal block assemblies electrically connected to one another by cables.

Referring to FIG. 2, one arrangement is illustrated that provides maintenance workers with easier access to the terminal block of the generator 16. A first terminal block assembly 24 provides the exterior electrical connection to the interiorly located stator within the housing 22 of the generator 16. Cables 28 electrically connect the first terminal block assembly 24 to a second terminal block assembly 26 that is positioned in a location more easily accessible by a maintenance workers. The second terminal block assembly 26 includes a terminal block 30 mounted to the housing 22. A cover 32 is secured relative to the terminal block 30 over the cables 28, which extend from a first opening 33 provided by the cover 32.

Figure 3A:
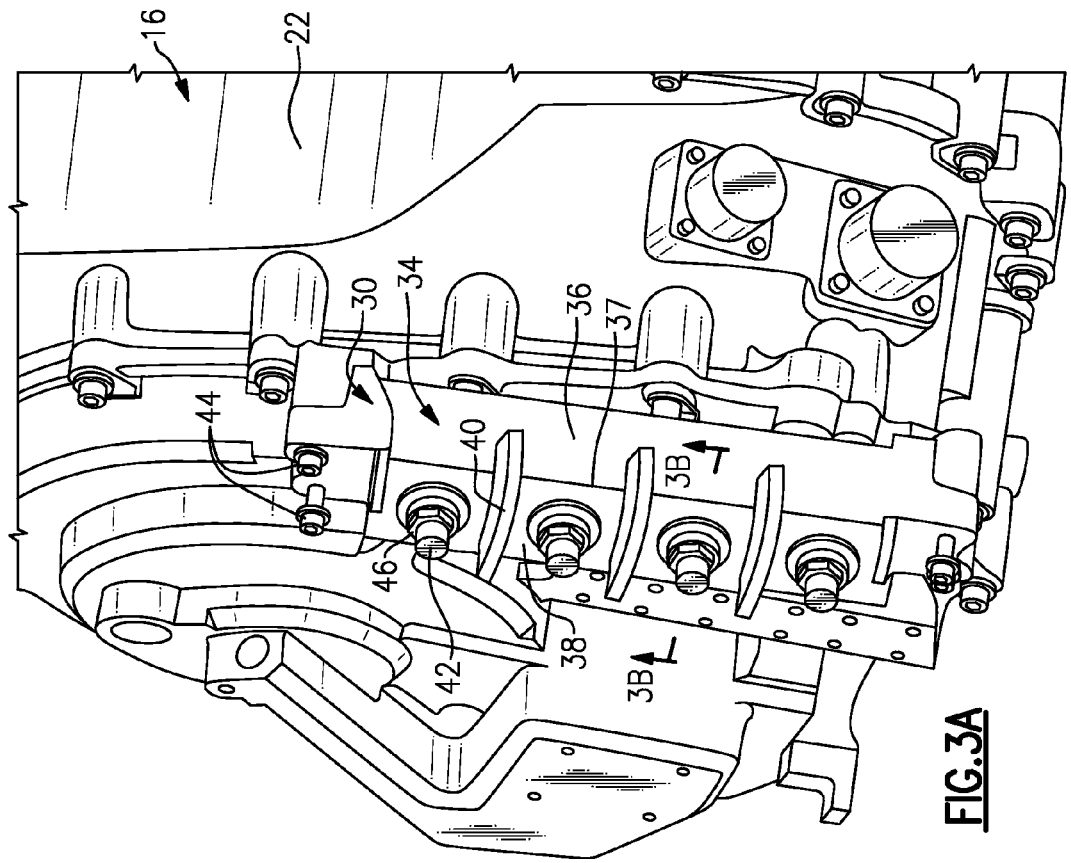
FIG. 3A is a partial side perspective view of the generator and the second terminal block assembly with its cover and cables removed.
Figure 3B:
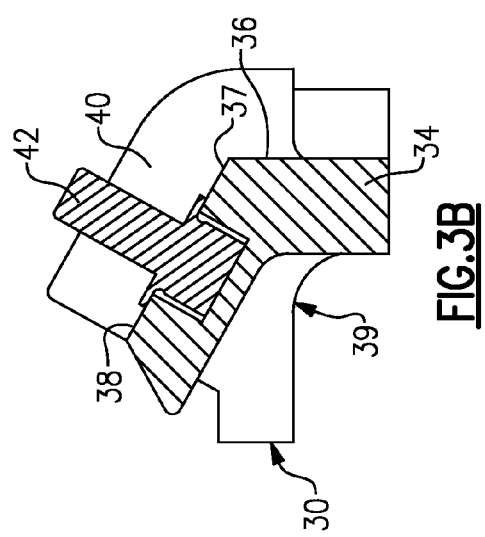
FIG. 3B is a cross-sectional view of a terminal block shown in FIG. 3A taken along lines 3B-3B.

Referring to FIGS. 3A and 3B, the terminal block 30 includes a base 34 providing first and second adjoining surfaces 36, 38 that are transversely arranged relative to one another. The first and second surfaces 36, 38 provide an apex 37 and are arranged at an angle of approximately 60° relative to one another. Protrusions 40 extend from and overlap the first and second surfaces 36, 38 on a top side of the base 34 and are spaced apart from one another to provide terminal areas at which the cables are connected. A terminal stud 42 is provided at each of the terminal areas and extends from the second surfaces 38. The first surface 36 is without terminal studs. The terminal studs 42 are insulated from the housing 22 by a backside 39 of the base 34 to prevent an electrical ground between the terminal studs 42 and the housing 22. Fasteners 44 secure the base 34 to the housing 22. Nuts 46 are threadingly received onto the terminal studs 42 to secure the cables 28 to the terminal block 30, as illustrated in FIG. 4.

Referring to FIG. 4 and FIGS. 6A-6B, the cables 28 include opposing ends 48a, 48b. The end 48b includes a lug 50 having a barrel 52 providing a barrel axis 53. A flange 54 is positioned in its respective terminal area between the protrusions 40 and extends from the barrel 52 and provides first and second adjoining portions 56, 58. The first portion 56 interconnects the barrel 52 to the second portion 58. A bend 60 is provided between the first and second portions 56, 58, which are oriented relative to one another at a twist angle T of approximately 27 degrees and a bend angle B of approximately 57 degrees. The first portion 56 is generally parallel with the first surface 36. The relative bend between the first and second portions 56, 58 enables the lug 50 to lie in close proximity to the first and second surfaces 36, 38. The second portion 58 includes a hole 62 through which the terminal stud 42 extends.

The cable 28 includes a jacketed wire 64 received in the barrel 52. An insulation sleeve 66 is provided over the barrel 52 and the jacketed wire 64 to ensure adequate insulation. The cover 32 provides a perimeter 68 that extends over the insulated portion of the end 48*b*.

Figure 7:
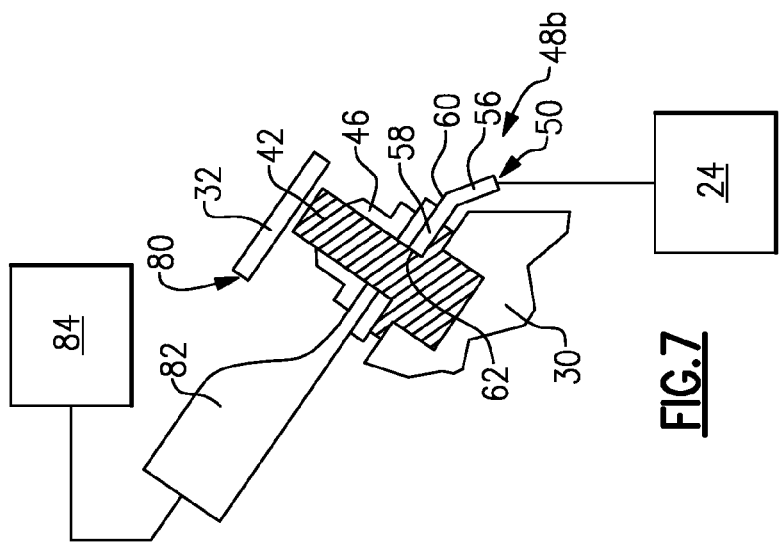
FIG. 7 is a cross-sectional schematic view of a portion of the terminal block similar to the illustration in FIG. 3B with first and second cables secured to a common terminal stud.
Figure 5:
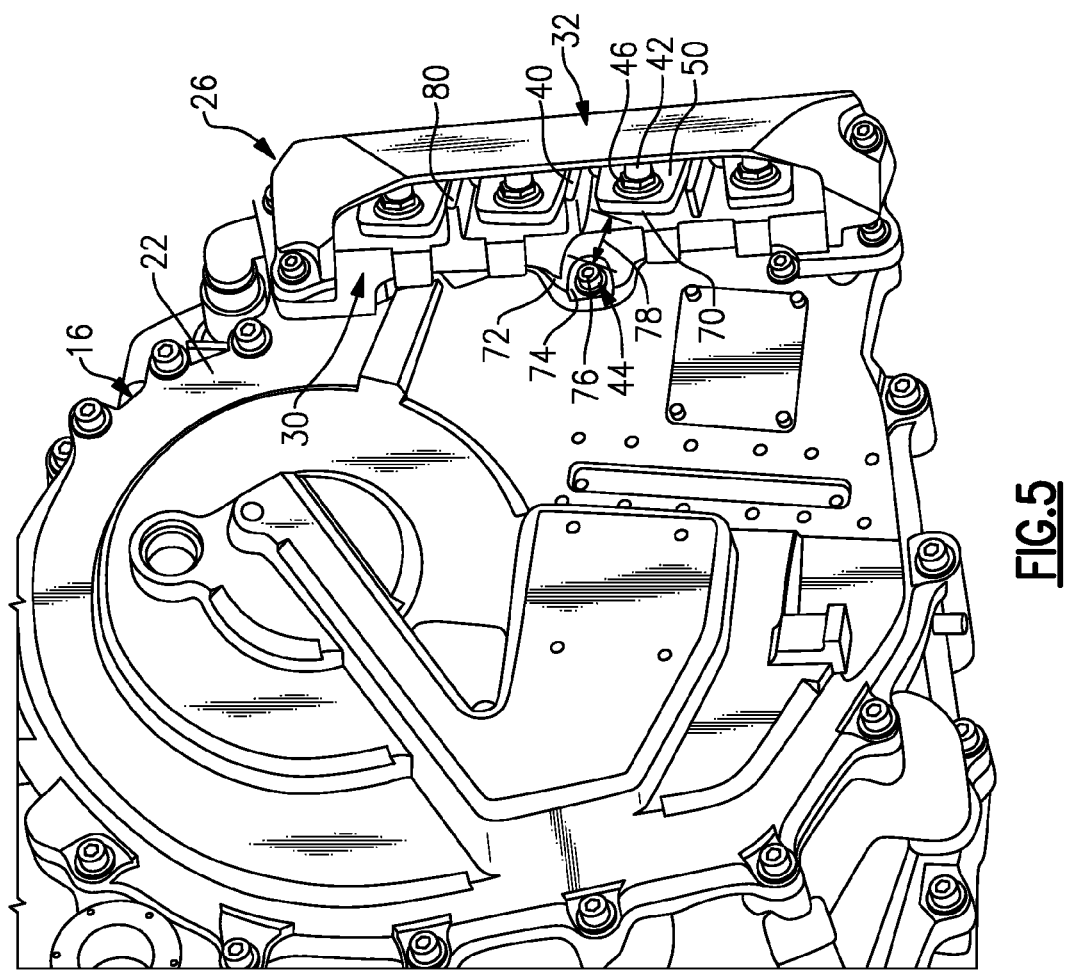
FIG. 5 is an end perspective view of the second terminal block assembly illustrated in FIG. 2.

Referring to FIGS. 5 and 7, the cover 32 includes a second opening 80 opposite the first opening 33. The second opening 80 accommodates power cables 82 that are secured to the terminal studs 42 to provide power from the generator 16 by cables 28 to an electrical component 84.

The lug 50 includes an edge 70. The base 34 includes multiple ears 72 that receive the fasteners 44 securing the terminal block 30 to the housing 22. One of the ears 72 arranged between the opposing ends of the terminal block may be positioned in close proximity to the edge 70. This ear 72 includes a recess 74, for example, ensuring that a head 76 of the corresponding fastener 44 is at least a distance 78 of greater than 0.50 inches from the edge 70 to this fastener prevent the grounding of the lug 50 during a lightening strike, for example.

Although an example embodiment has been disclosed, a worker of ordinary skill in this art would recognize that certain modifications would come within the scope of the claims. For that reason, the following claims should be studied to determine their true scope and content.

What is claimed is:

1. A terminal block assembly for a generator comprising:
   a terminal block have a base including first and second transverse surfaces adjoining one another, and spaced apart protrusions extending from the first and second surfaces to provide spaced apart terminal areas overlapping the first and second surfaces and configured to receive a cable lug; and
   a terminal stud provided in each terminal area and extending from the second surface, the first surface without terminal studs.

2. The assembly according to claim 1, wherein the base includes ears configured to receive fasteners for securing the terminal block to a component.

3. The assembly according to claim 1, comprising a cover configured to be secured over the terminal block and including first and second openings on opposing sides of the cover respectively configured to receive first and second sets of cables.

4. The assembly according to claim 3, comprising a cable including a lug arranged in a terminal area between the base and the cover, the lug secured to the terminal stud with a nut.

5. The assembly according to claim 4, wherein the cover includes a perimeter overlapping the cable and extending over the lug providing only an insulated portion of the cable extending outwardly from the terminal stud and beyond the perimeter.

6. The assembly according to claim 4, wherein the lug includes a barrel and a flange having first and second portions, the first portion interconnecting the barrel and the second portion, the second portion providing a hole receiving the terminal stud, the first and second portions respectively overlapping the first and second surfaces.

7. The assembly according to claim 6, wherein the first and second portions adjoin one another at a bend, and having twist and bend angles relative to one another.

8. The assembly according to claim 6, wherein the flange includes an edge, and comprising a fastener configured to secure the terminal block to a component, and a distance of greater than 0.50 inches separating each of the fasteners and each of the terminals closest to the fastener.

9. The assembly according to claim 6, wherein a second cable having a second lug is secured to the same terminal stud as the cable.

10. A generator comprising:
    a generator housing;
    first and second terminal blocks secured to the housing remotely from one another;
    cables electrically connecting the first and second terminal blocks to one another; and
    wherein the second terminal block has a base including first and second transverse surfaces adjoining one another, and spaced apart protrusions extending from the first and second surfaces to provide spaced apart terminal areas overlapping the first and second surfaces and configured to receive a cable lug, and a terminal stud provided in each terminal area and extending from the second surface, the first surface without terminal studs.

11. The generator according to claim 10, wherein the cables include a lug arranged in a terminal area between the base and the cover, the lug secured to the terminal stud with a nut.

12. The generator according to claim 11, wherein the lug includes a barrel providing a barrel axis and receiving a jacketed wire, the lug including a flange having first and second portions, the first portion interconnecting the barrel and the second portion, and the first and second portion adjoining at a bend providing twist and bend angles between the first and second bend portions of respectively approximately 27 degrees and 57 degrees.

13. The generator according to claim 12, wherein the second portion provides a hole receiving the terminal stud, the first and second portions respectively overlapping the first and second surfaces, the flange includes an edge, and comprising a fastener configured to secure the terminal block to the housing, and a distance of greater than 0.50 inches separating each of the fasteners and each of the terminals closest to the fastener.

\* \* \* \* \*